(12) United States Patent
Rhodes (10) Patent No.: US 8,573,285 B2
(45) Date of Patent: Nov. 5, 2013

(54) POLYMER MANIFOLD AND POLYMER HEAT EXCHANGER

(76) Inventor: Richard O. Rhodes, San Francisco, CA (US)

( * ) Notice: Subject to any disclaimer, the term of this patent is extended or adjusted under 35 U.S.C. 154(b) by 372 days.

(21) Appl. No.: 13/071,322

(22) Filed: Mar. 24, 2011

(65) Prior Publication Data
US 2012/0240920 A1 Sep. 27, 2012

(51) Int. Cl.
*F28F 19/04* (2006.01)
*F28F 9/16* (2006.01)

(52) U.S. Cl.
USPC ............. 165/79; 165/133; 165/158; 165/173; 165/178

(58) Field of Classification Search
USPC .............. 165/158, 173, 79, 133, 178
See application file for complete search history.

(56) References Cited

U.S. PATENT DOCUMENTS

| | | | | |
|---|---|---|---|---|
| 3,277,959 A | * | 10/1966 | Withers | 165/159 |
| 3,724,537 A | * | 4/1973 | Johnson | 165/133 |
| 3,922,768 A | * | 12/1975 | Takayasu | 165/173 |
| 3,934,323 A | | 1/1976 | Ford et al. | |
| 3,993,126 A | * | 11/1976 | Taylor | 165/173 |
| 4,215,744 A | * | 8/1980 | Bowles | 165/158 |
| 6,038,768 A | | 3/2000 | Rhodes | |
| 6,269,871 B1 | * | 8/2001 | Nishio et al. | 165/173 |
| 2009/0151714 A1 | | 6/2009 | Rhodes | |

* cited by examiner

*Primary Examiner* — Leonard R Leo
(74) *Attorney, Agent, or Firm* — Beyer Law Group LLP

(57) ABSTRACT

A variety of methods of forming polymer manifolds and the resulting manifold structures are described. The described manifolds are well suited for use in heat exchangers and a variety of other applications. In one aspect a polymer manifold includes a multiplicity of tubes having first ends that are received by a manifold housing. A polymer film is secured to the manifold housing and to the ends of each of the tubes. The film is arranged to seal the housing while leaving the openings of the tubes exposed to thereby create a manifold. In some embodiments, a potting material is used to reinforce the film. In a method aspect, a manifold may be formed by positioning first ends of the tubes in a manifold housing and welding a polymer film to the manifold housing and to distal tips of the tubes. Openings for the tubes are then formed in the film by directing heat towards the film which melts or vaporizes the film in the regions of the tube openings. A liquid coolant or potting material is placed inside of the chamber within the manifold housing that is sealed by the film during the heating to help prevent the heat from damaging the seals between the film and the tube tips or the film in the interstitial spaces between the tubes.

16 Claims, 10 Drawing Sheets

POLYMER MANIFOLD AND POLYMER HEAT EXCHANGER

BACKGROUND OF THE INVENTION

The present invention relates generally to manifolds and heat exchangers formed from polymer materials and to methods of producing the same.

Heat exchangers are used in a wide variety of applications and have a wide variety of geometries and designs for specific applications. Most often, heat exchangers are formed from a metal material such as copper, aluminum or stainless steel due to the favorable heat transfer characteristics that are displayed by such materials. Although metal heat exchanger designs work well for many applications, metals tend to be more expensive or more subject to corrosion than certain other materials such as plastics and there are some applications where it is desirable to form a heat exchanger from lower cost polymer materials.

One class of heat exchangers contemplate dividing a feed stream of one heat exchange medium into multiple streams that pass through a second heat exchange medium. Such heat exchanger typically employ inlet and outlet manifolds to divide and reunite the feed stream into/from a number of relatively narrow tubes that are arranged to pass through the second heat exchange medium. The fabrication of such manifolds can be difficult when the tubes and/or manifolds are formed from a plastic (or other polymer) material. Although polymer manifold and polymer heat exchanger designs exist, there are continuing efforts to provide improved manifold and heat exchanger designs that are well suited for use in specific applications. The present application describes a low cost polymer manifold design that is well suited for use in a variety of heat exchanger designs. The polymer manifold may also have extensive applications outside of the heat exchanger field.

SUMMARY OF THE INVENTION

A variety of methods of forming polymer manifolds and the resulting manifold structures are described. In one aspect a polymer manifold includes a multiplicity of tubes having first ends that are received by a manifold housing. A polymer film is secured to the manifold housing and to the first ends of each of the tubes. The polymer film is arranged to seal a first end of a bore or other chamber within the manifold housing while leaving the first openings of the polymer tubes exposed to thereby create a manifold. In some embodiments, a potting material is used to reinforce the film. The described manifolds are well suited for use in heat exchangers and a variety of other applications.

In a method aspect, a manifold may be formed by positioning first ends of a multiplicity of polymer tubes in a manifold housing and welding a polymer film to the manifold housing and to distal tips of the tubes. Openings for the tubes are then formed in the film by directing heat towards the film which melts or vaporizes the film in the regions of the tube openings. A liquid coolant is placed inside of the chamber within the manifold housing that is sealed by the film during the heating to help prevent the heat from damaging the seals between the film and the tube tips or the film in the interstitial spaces between the tubes. In embodiments that utilize a potting material, the potting material may optionally be introduced after the tubes have been opened. In some embodiments, the potting compound may be used to instead of a liquid coolant to help prevent the heat from damaging the seals between the film in the interstitial spaces between the tubes.

In some embodiments, the tubes are inserted into the manifold housings as a connected bundle of tubes. One suitable approach to forming a tube bundle contemplates securing the tubes to at least one separating strip to form a mat of parallel tubes. The separating strips are arranged to help space adjacent tubes apart. The mat is then rolled into a longitudinally extending roll to form the tube bundle.

In some embodiments a polymer heat exchanger is formed that includes polymer film based manifolds on one or both ends of the tubes. The manifold housings may include a threaded section for threadably connecting the manifold to a conduit, fitting or other suitable mechanism that is arranged to communicate a fluid to or from the multiplicity of tubes. The described heat exchangers may be used in a wide variety of heat exchange systems. In some embodiments, the heat exchanger may be placed within a tank or other housing to facilitate heat transfer between a first fluid passing through the tubes and a second fluid held within the tank.

One specific application of the heat exchanger contemplates its incorporation into a polymer solar collection system.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

The present invention relates generally to polymer heat exchangers. In general, polymer materials may be used to form a low cost heat exchanger that can perform well in a variety of applications.

Figure 1:
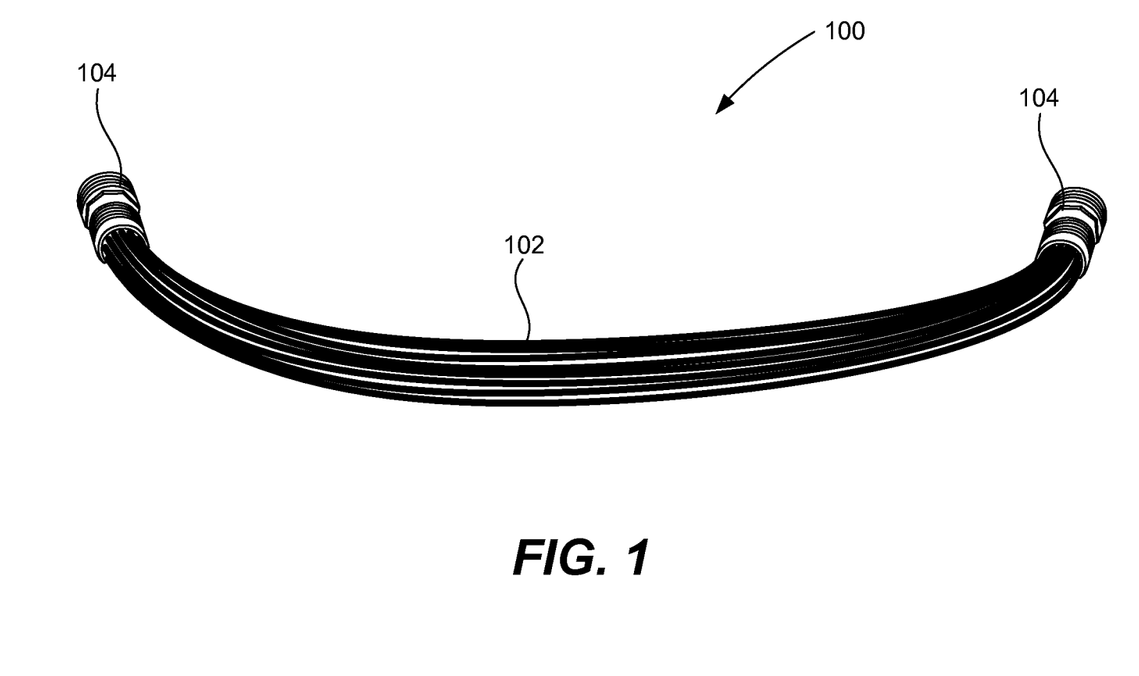
FIG. 1 is a diagrammatic perspective illustration of a polymer heat exchanger in accordance with one embodiment of the present invention.

Referring initially to FIG. 1, a polymer heat exchanger in accordance with one embodiment of the present invention will be described. In the illustrated embodiment, the heat exchanger 100 includes a multiplicity of plastic tubes 102 having a pair of manifolds 104 on opposing ends. The diameter and length of the tubes may be widely varied to meet the needs of any particular application. Preferably, the tubes will have small diameters and relatively thin walls. By way of example, polymer tubes having an outer diameter in the range of approximately 0.08 to 0.25 inches work well for many applications, although both larger and smaller tube diameters may be used in particular applications. Inner tube diameters may also vary widely although it should be appreciated that thin walls are generally preferred since thin walls will generally improve the heat exchangers thermal performance by decreasing the temperature drop across the tube walls.

Figure 2A:
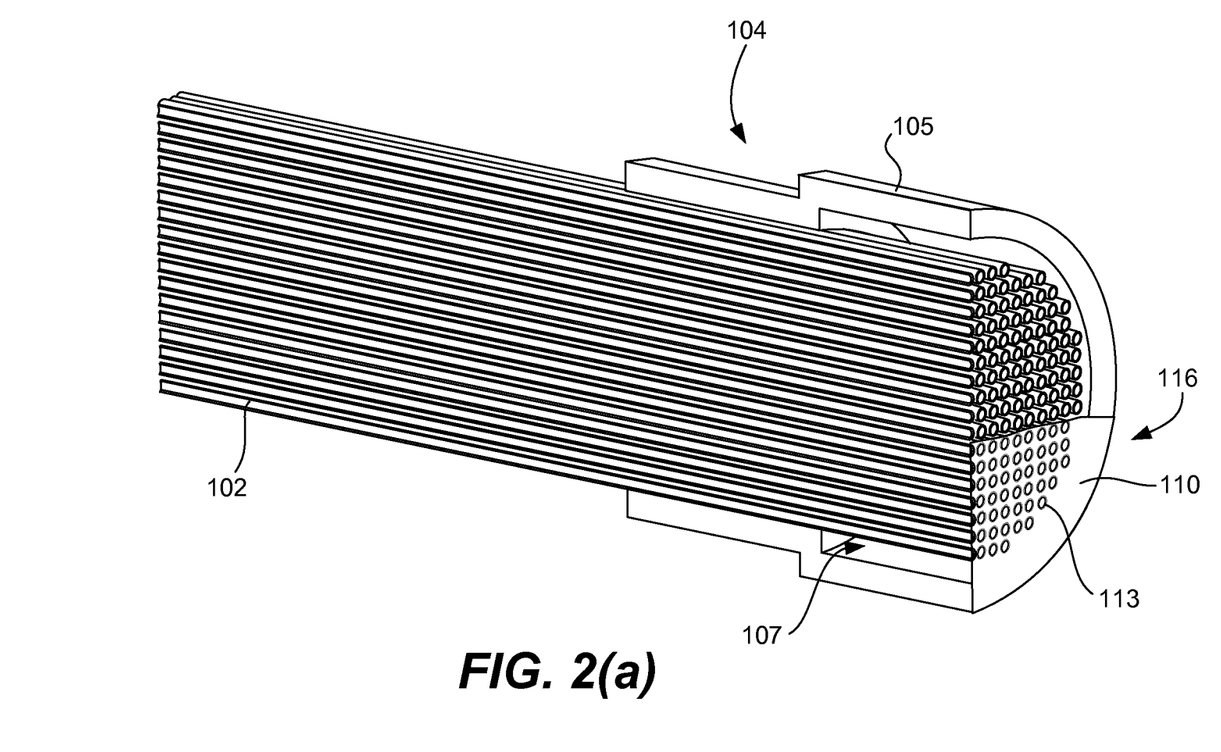
FIGS. 2(a) & 2(b) are perspective, partially cut away, cross sectional views of manifolds formed in accordance with embodiments of the present invention.

A representative manifold 104 is illustrated in the partially cut-away, perspective, cross-sectional view of FIG. 2(a). Each manifold 104 includes a manifold housing 105 having chamber 107 that receives an associated end of each of the tubes 102. In the illustrated embodiment, the manifold housing has a tubular configuration and the chamber 107 takes the form of a bore in the tubular manifold housing. However, it should be appreciated that the actual geometry of both the manifold housing 105 and its associated chamber 107 may be widely varied.

Figure 2B:
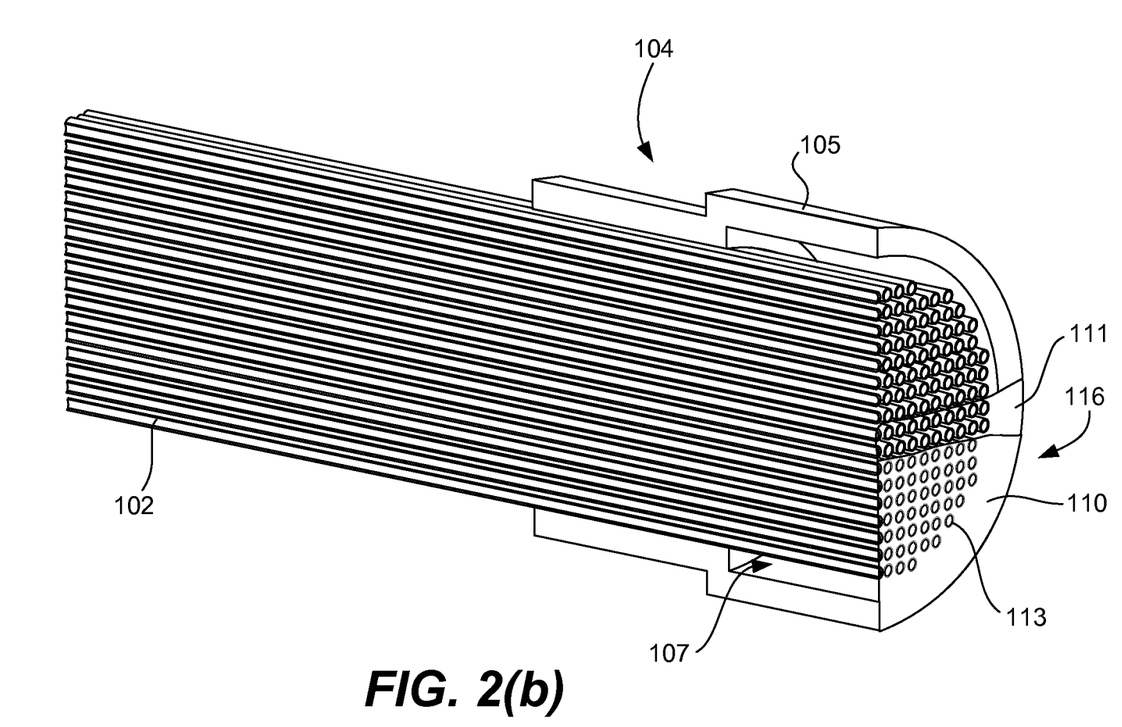
Figure 3:
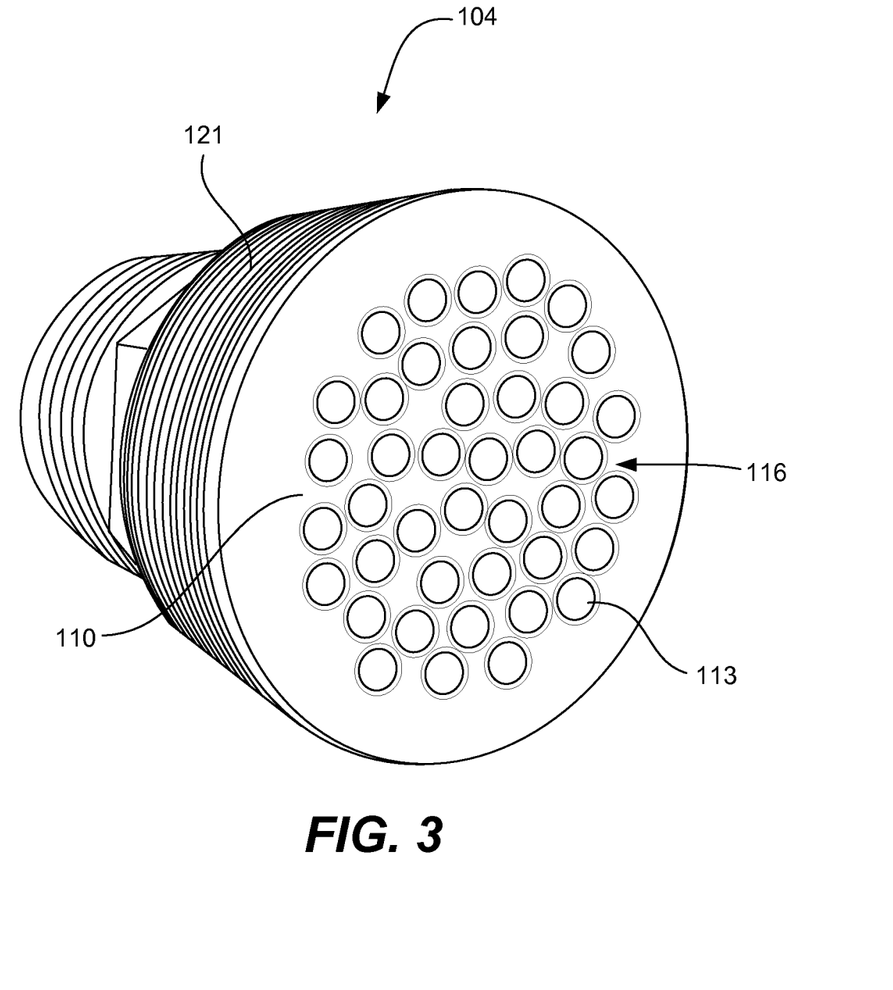
FIG. 3 is a perspective view of a manifold formed in accordance with another embodiment of the present invention.

A polymer film 110 is welded to both the housing 105 and the distal tips of the associated tubes 102 to thereby substantially seal one end of the chamber 107. It is noted that for illustrative purposes, in the partially cut-away view of FIG. 2(a), only a quarter of the film 110 is shown to help highlight the attachment of the film too the tubes. In a working manifold, the film would preferably cover the entire end of chamber to adequately seal the chamber as shown in FIG. 3. A number of openings 113 are provided in the film to facilitate access to the channels within the tubes 102. Thus, the polymer film constitutes a manifold face 116 that permits access to the multiplicity of tubes 102. As can be seen in FIGS. 2(a) and 3, the manifold face 116 is generally defined by the film 110 with the tube channels opening therein. In another embodiment, shown in FIG. 2(b), another layer 111 can be formed on the manifold housing such that the layers 110, 111 overlie one another. Thus, at least one additional polymer film secured over the first polymer film to create a multi-layer polymer film arranged to seal the first end of the chamber while leaving the first openings of the polymer tubes exposed. This feature is described in further detail elsewhere in the specification.

The manifolds 104 may take a variety of geometries and are preferably configured to facilitate coupling to fluid supply and drain conduits. In the illustrated embodiment, the housing 105 includes a threaded portion 121 having a substantially cylindrical cross section so that the manifold may readily be connected to a pipe or a pipe coupler (as seen for example in FIG. 5).

The tubes 102 and manifolds 104 may be formed from a wide variety of plastics and other polymers. By way of example, Polyethylene, Polypropylene, Polyamide, Polysulfone, and Polyphenylene Sulfide work well for both the tubes and the manifolds. Of course, in other embodiments, a wide variety of other plastics and polymers may be used. The tubes and manifolds may be formed from the same materials, substantially the same materials or different materials depending on the requirements of any particular application.

The film 110 is also preferably formed from a plastic or other polymer material. The film 110 may be optionally formed from the same or a similar material as the polymer tubes. By way of example, Polyethylene, Polypropylene, Polyamide, Polysulfone, and Polyphenylene Sulfide work well, although again, a wide variety of other polymer materials may be use as well.

In some embodiments, a portion of the chamber 107 adjacent the inner surface of film 110 is filled with a potting material 129. The potting material helps structurally reinforce the film 110 and can help insure that the manifold remains sealed even in the event that a small tear occurs in the foil during use. A wide variety of potting materials may be used for this purpose. By way of example, Polyurethanes and Silicones work well.

The described heat exchanger may be used in a wide variety of applications. One such application is diagrammatically illustrated in FIG. 5. In the illustrated embodiment, the heat exchanger 100 is placed within a tank 200. An inlet or feed pipe 205 delivers a working fluid (such as water or any other heat exchange medium) to an upstream coupler 208 that connects the feed pipe 205 to one of the heat exchanger manifolds 104. The working fluid enters the tubes 102 through the manifold face and pass through the tubes 102 which extend through the tank. The tubes 102 are preferably numerous and spaced apart outside of the manifold housing 104 so that they present a lot of surface area within the tank. Heat is transferred between the working fluid passing through the tubes and the working fluid located within the tank. The manifold 104(b) located on the downstream side of the heat exchanger is connected to an outlet or discharge pipe 212 through a downstream coupler 214. The inlet and outlet pipes may be plumbed in any desired manner that makes use of the heat exchanger.

Figure 5:
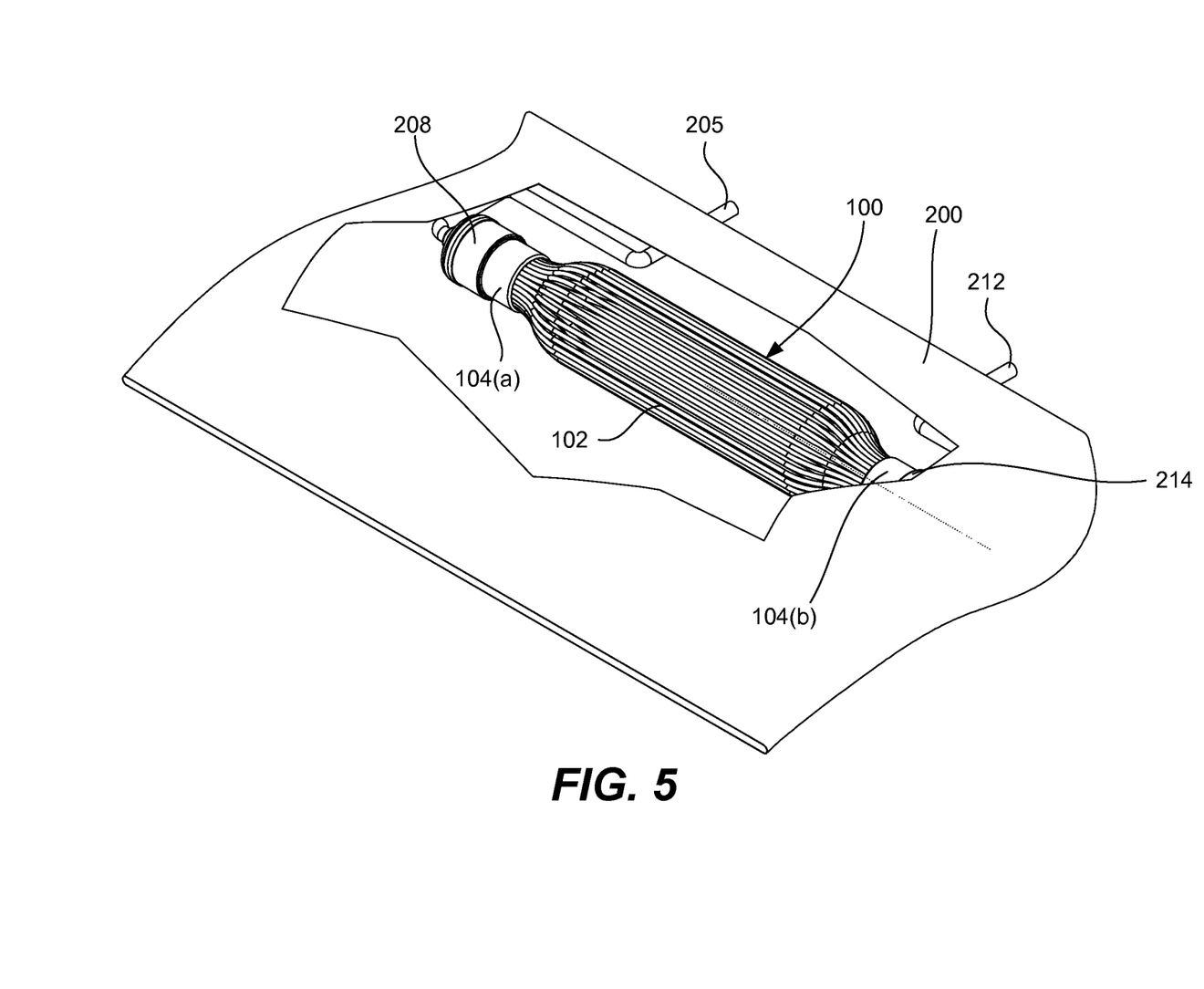
FIG. 5 is a diagrammatic perspective view of a tank having a heat exchanger in accordance with one embodiment of the invention positioned therein.

In the embodiment illustrated in FIG. 5, the heat exchanger 100 is positioned within a tank 200. It should be appreciated that in place of the tank, the heat exchanger may be positioned in a variety of other containers, housings or conduits in order to facilitate heat transfer to or from fluids within such containers or conduits, or may be placed in open bodies of liquid (e.g. water) or air to facilitate the transfer of heat to of from such bodies of liquid or air.

By way of example, one specific application of the polymer heat exchanger is in the tank of the very low cost polymer solar collector described in U.S. patent application Ser. No. 12/389,150 by the present inventor which is incorporated herein by reference. Although a specific application of the heat exchanger within a solar collector tank is mentioned, it should be appreciated that the described heat exchanger may be applied in a wide variety of applications outside of the solar field as well.

Figure 6:
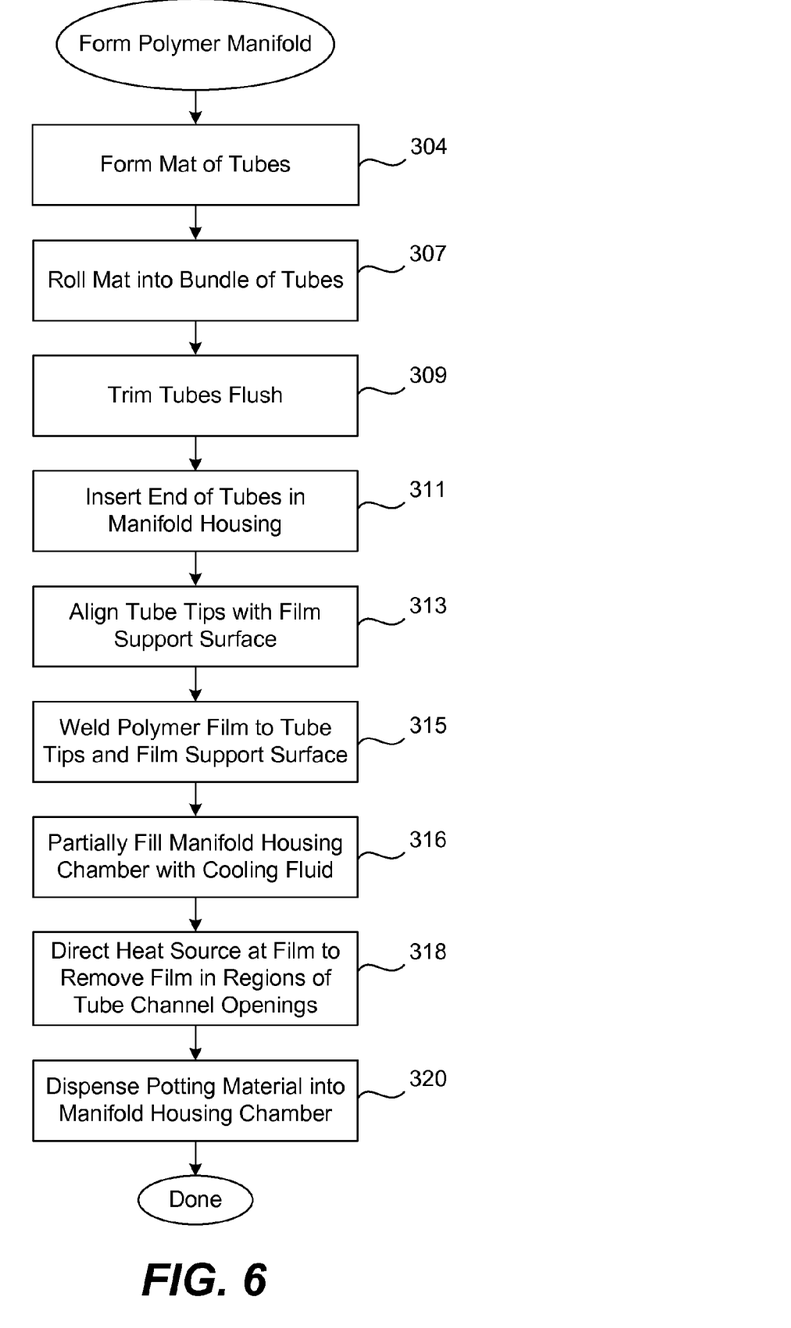
FIG. 6 is a flow chart illustrating one method of fabricating a polymer manifold in accordance with another embodiment.
Figure 7A:
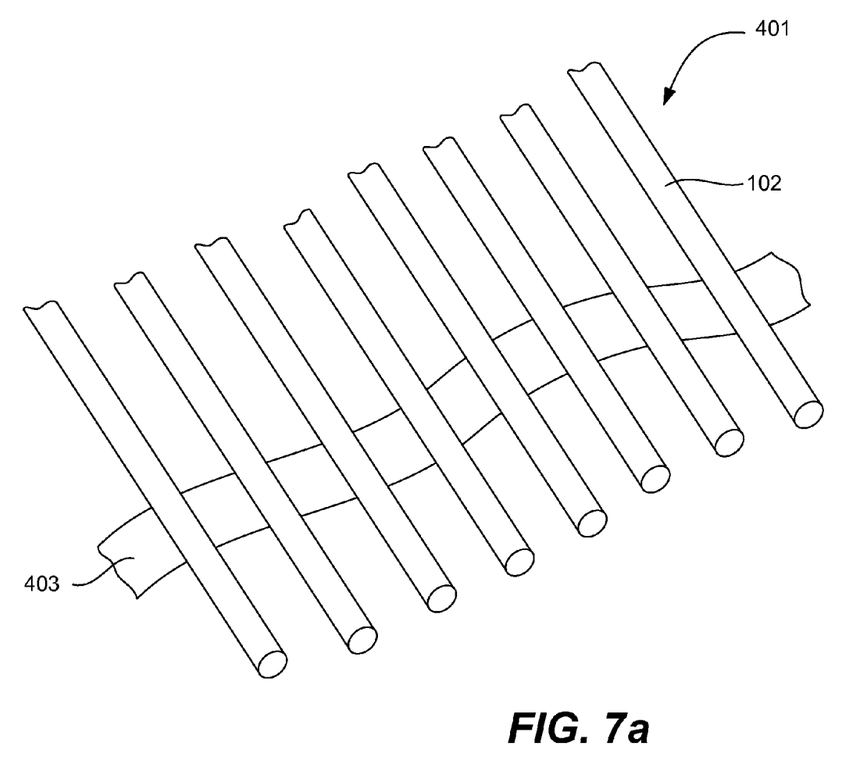
FIG. 7(a) is a diagrammatic illustration of a mat of tubes suitable for forming a tube bundle.
Figure 7B:
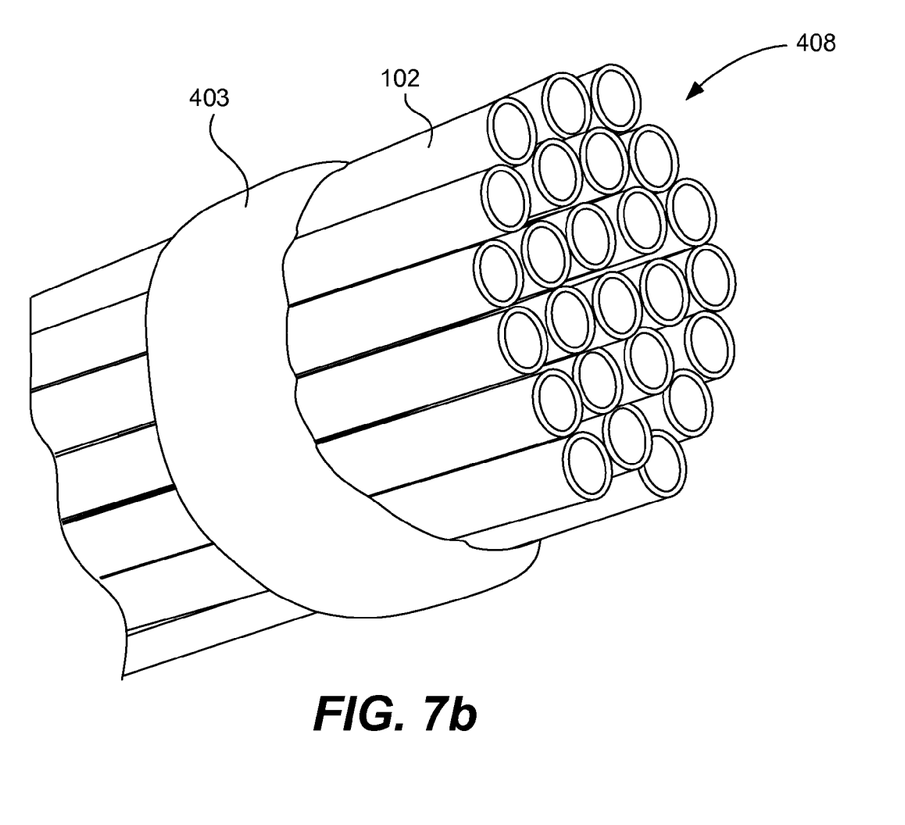
FIG. 7(b) is diagrammatic illustration of a tube bundle arranged for insertion into a manifold.

Referring next to FIG. 6 in conjunction with FIGS. 7-9 and 3, a method of manufacturing the heat exchanger 100 will be described. Initially a bundle of tubes 408 is formed. This may be accomplished by first forming a mat 401 of parallel tubes (step 304) as best seen in FIG. 7(a). The tubes are held together in a generally spaced apart and parallel orientation by a plurality of separating strip 403 as illustrated in FIGS. 7(a) and 7(b). The separating strips may be simple adhesive strips that adhesively hold the tubes in place, plastic strips suitable for welding to the tubes, a plastic clip that holds the tubes in place (as for example somewhat similar to the clips described in U.S. Pat. No. 6,487,768) or any other suitable mechanism. In the embodiment illustrated in FIG. 7(a), a welded plastic strip is used having a thickness adequate to separate the tubes from each other after the tube bundle is rolled.

Figure 8:
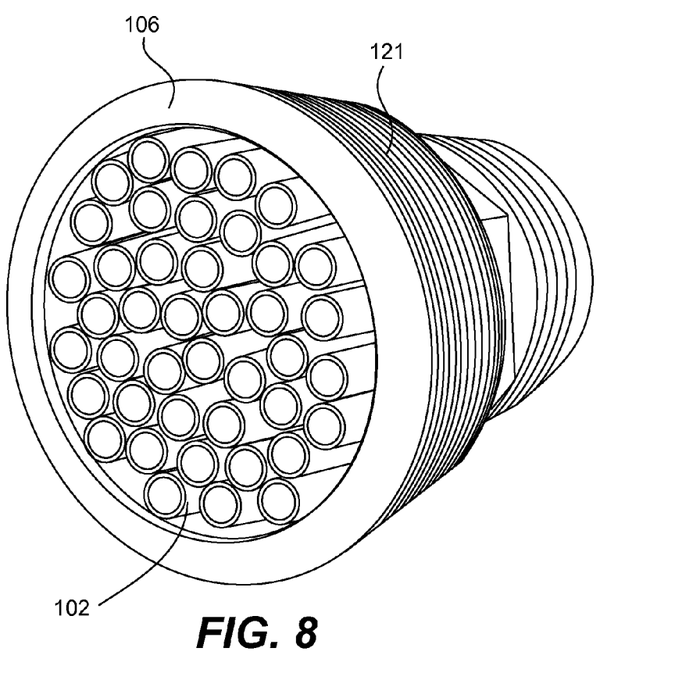
FIG. 8 is a diagrammatic perspective view of the end of a manifold housing having a bundle of tubes positioned therein.
Figure 9:
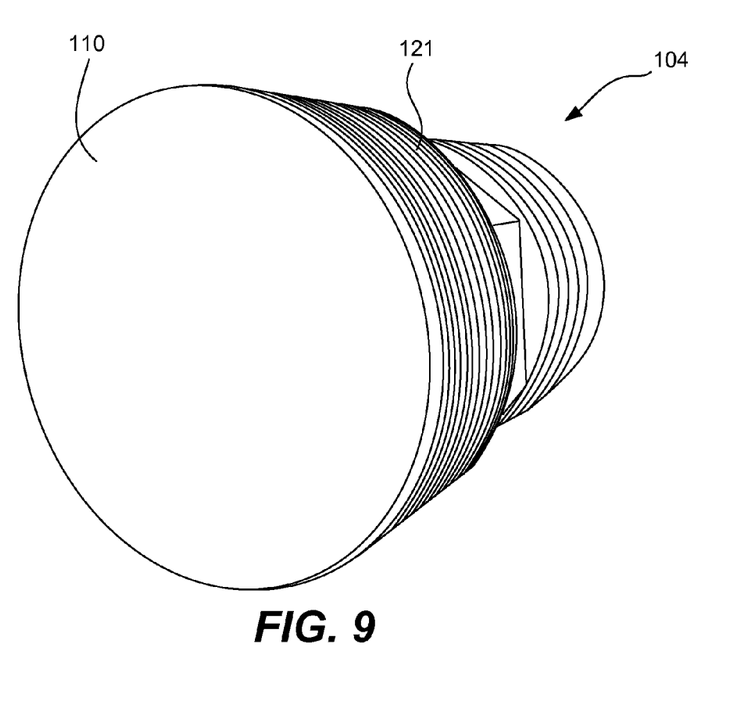
FIG. 9 is a diagrammatic perspective view of the end of the manifold housing of FIG. 8 after attachment of a polymer film.

After the mat is formed, a suitable width of mat is rolled into a bundle in step 307 to form a tube bundle 408 as best illustrated in FIG. 7(b). Each end of the tube bundle may optionally then be aligned or trimmed flush (step 309) using an alignment block, a blade, heat or other suitable mechanisms. After being trimmed, the ends of the bundles are inserted into the manifolds (Step 311) such that the end edges of the tubes are positioned substantially flush with a film support surface 106 of the manifold housing as seen if FIG. 8. In many implementations (such as the embodiment illustrated in FIG. 8), the film support surface 106 is a distal end edge (outside surface) of the manifold housing 105. The film support surface of the manifold housing may then be pressed on a hot platen to form a uniform surface with the tips of the tubes. (Step 313). A thin polymer film is then welded to the distal tips of the tube and the manifold's film support surface. (Step 315). An end view of the resulting sealed structure is illustrated in FIG. 9. The film welding may be accomplished using a welding platen or other suitable means.

The manifold may then be positioned with its open end facing up and at least partially filled with a cooling fluid. (Step 316). The cooling fluid is typically a liquid such as water with a detergent mixed therein. It is noted that the tubes are preferably not filled in this operation. Rather, only the chamber within the manifold is filled and there is typically no need to fully fill the chamber (although fully filling the chamber is sometimes permissible. With the cooling fluid in place, a heat source is briefly directed at the film surface to melt or vaporize the film only in the regions of the tube channel openings. (Step 318). A variety of heat sources may be used for this purpose. By way of example, an infrared heat source works well. The heat is applied long enough to melt or vaporize the film in the regions of the tube channel openings, but not long enough to overly harm the film in the interstitial spaces between the tubes. This results is the manifold structure illustrated in FIG. 3.

It should be appreciated that during the heating of the film, the cooling fluid within the manifold chamber helps limit the maximum temperature of the film in the regions of the manifold face outside of the channel openings, which thereby helps prevents the heat from damaging the seals between the film and the tubes and/or the destruction of the film in the interstitial spaces between tubes. In some cases, the cooling fluid may actually boil in certain places adjacent the film during the formation of the channel openings, which further helps the cooling. After the openings 113 have been formed, the cooling liquid may be disposed of. The actual amount of liquid that is appropriate for use as a heat sink within the manifold during the formation of the tube openings can vary widely with the specific application. The important factor is that enough liquid be provided and that the timing of the heat application be arranged so that the polymer film outside the regions of the tube channel openings are not unduly damaged during the formation of the openings 113.

An impulse or a sequence of vibrations or impulses may optionally be applied to the film while forming the openings in order to further assist in the formation of the openings in some embodiments. The impulse(s), which may take the form of sudden pressure waves, shock waves, high frequency vibrations or any other suitable form can help increase the removal of material from the openings. It should be appreciated that the application of an impulse or vibrations to the film is entirely optional.

Figure 4:
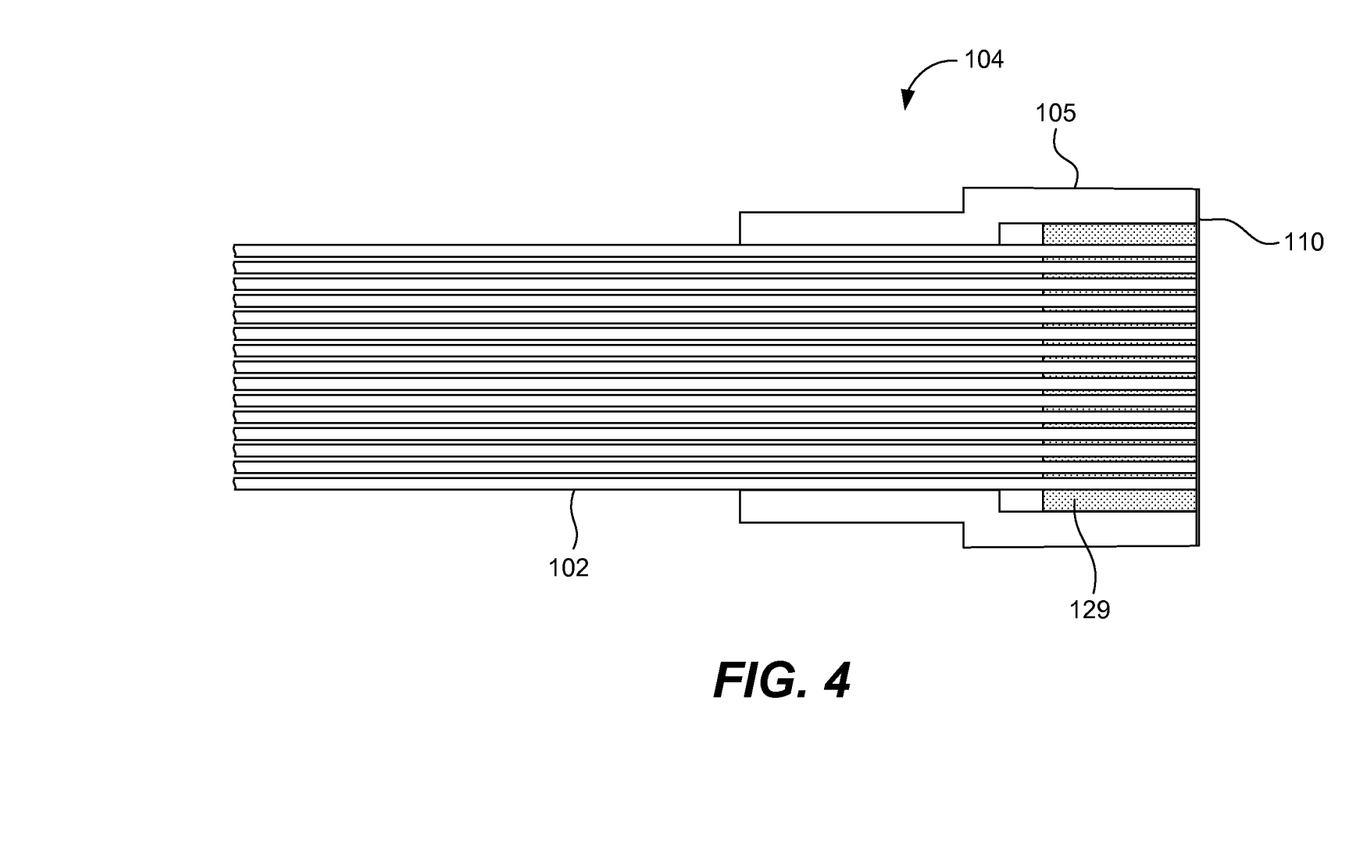
FIG. 4 is a cross sectional side view of a manifold similar to the manifold of FIG. 2(a) highlighting the use of a potting material to reinforce the polymer film.

After the openings have been formed, the tube side of the polymer film 110 may be reinforced by introducing a potting material 129 that fills at least a portion of the manifold chamber as illustrated in FIG. 4. (Step 320). The potting material preferably contacts the inner surface of the film and thereby reinforces the film to help prevent failure of the film caused by pressure that the manifold is subjected to during use and/or handling. As mentioned above, a variety of potting materials may be used and by way of example, Polyurethanes and Silicones work well.

In the first described embodiment, the potting fluid is introduced separately from the cooling fluid after the openings have been formed and the cooling fluid removed (e.g. dumped out). However, in alternative embodiments, the potting material itself may be used as the coolant. For example, when the potting compound has good thermal conductivity or sufficient heat capacity to protect the film, the potting compound may be used to protect the film in place of the cooling fluid. In some such embodiments, the potting compound is introduced and set prior to the formation of the tube channel openings so that a solid potting compound replaces the liquid cooling fluid. In still other embodiments, a low viscosity potting compound may be introduced as the cooling fluid and the tube channel openings may be formed before the potting compound sets. Generally, when a fluid potting compound is used, it will be important to insure that the viscosity and physical properties of the potting compound are such that any potential boiling of the potting compound during the formation of the openings doesn't inadvertently trap bubbles within the potting compound that interfere with the curing or the function of the potting material. In still other embodiments, the cooling fluid may be used in the formation of the potting material.

It should be appreciated that the described approach allows the substantially simultaneous sealing of many small diameter tubes with respect to a manifold chamber to create a high density manifold without the need for precise tube alignment, over molding or additional machining operations to open channels that have been blocked during molding. Thus, a very low cost arrangement for forming a plastic or other polymer heat exchanger manifold that includes openings to a relatively large number of heat exchange tubes is described.

Although only a few embodiments of the invention have been described in detail, it should be appreciated that the invention may be implemented in many other forms without departing from the spirit or scope of the invention. For example, although the manifold formation has been described primarily in the context of a heat exchanger manifold, it should be appreciated that the described polymer manifold may be used in a wide variety of applications and its uses are not in any way limited only to heat exchanger manifolds.

In the primary described embodiment, a single film is used seal the end of the manifold chamber. However, it should be appreciated that more than one film can readily be welded to the ends of the tubes to build a stronger and thicker manifold face. When multiple film layers are used, a plurality of film layers may be laid down before the holes are formed so that the openings are simultaneously formed through more than one film layers, or the holes may be formed sequentially after each film layer is attached. The use of such multi-layered film may be preferable in a number of specific applications.

Furthermore, the method of forming a manifold has been described in the context of a particular sequence of steps. It should be appreciated that in alternative embodiments, the sequence of the steps can sometimes be altered and some of the steps may be skipped, while others may be added. For example, although the rolled mat format is a particularly convenient way to insert the tubes, the tubes can be inserted in a variety of alternative manners as well. In another example, a dedicated trimming step can be eliminated by good alignment and/or the required alignment may be accomplished in other ways.

The method of forming a manifold has been described primarily in the context of forming a heat exchanger manifold. However, it should be appreciated that the described film based approach to may be used to attach a plurality of tubes to a variety of structures. For example, U.S. Pat. Nos. 3,934,323 and 6,038,768 describe approaches for attaching riser tubes to a header in a solar collector application. It should be appreciated that the approach described herein is well suited for use as an alternative approach to forming such header manifolds. Therefore, the present embodiments should be considered illustrative and not restrictive and the invention is not to be limited to the details given herein, but may be modified within the scope and equivalents of the appended claims.

The invention claimed is:

1. A polymer manifold comprising:
    a multiplicity of polymer tubes, each of the polymer tubes including first and second ends and a passage having first and second openings;
    a first polymer manifold housing that harnesses the first ends of the multiplicity of tubes, wherein the first manifold housing includes a chamber that receives and collectively surrounds the first ends of the tubes;
    a polymer film secured to a support surface of the first manifold housing and to a distal tip of the first end of each of the multiplicity of tubes, the polymer film being arranged to seal a first end of the chamber while leaving the first openings of the polymer tubes exposed to thereby create a manifold; and
    a potting material disposed within the chamber that reinforces the polymer film.

2. A device comprising, a polymer manifold as recited in claim 1;
    the device further comprising:
    a second manifold housing that harnesses the second ends of a plurality of the tubes, wherein the second manifold housing includes a second chamber that receives the second ends of the plurality of tubes; and
    a second polymer film secured to the second manifold housing and to the second ends of each of the plurality of tubes, the second polymer film being arranged to seal an end of the second manifold chamber while leaving the second openings of the plurality of polymer tubes exposed to thereby create a second manifold.

3. A polymer manifold as recited in claim 1 wherein the manifold housing includes a threaded section for threadably connecting the polymer manifold to a device arranged to communicate a fluid to or from the multiplicity of tubes.

4. A polymer manifold as recited in claim 1 wherein distal tips of the first ends of the tubes are substantially flush with a first face of the manifold housing and the polymer film is secured to the distal tips of the tubes and the first face of the manifold housing such that the first tube openings are presented on a plane that includes the first face of the manifold housing.

5. The device of claim 2 further comprising: a container arranged such that at least a majority of the length of the tubes are positioned within the container.

6. The device of claim 5 further comprising:
    a solar collector;
    a tank in fluid communication with the solar collector;
    wherein the polymer manifold is positioned substantially within the tank;
    a fluid supply line coupled to the first manifold housing for delivering a fluid to the heat exchanger; and
    a fluid delivery line coupled to the second manifold housing for transporting fluid that has passed through the heat exchanger.

7. The device as recited in claim 2 wherein the first and second openings in each polymer tube are located respectively at distal and proximal tips of the polymer tube and wherein the outer diameter of the polymer tubes is in the range of approximately 0.08 to 0.25 inches.

8. A polymer manifold as recited in claim 1 wherein the polymer tubes are secured together by a web and the web is rolled to form a bundle of tubes.

9. A polymer manifold as recited in claim 1 wherein the manifold housing is formed from the same polymer material as the polymer tubes.

10. A polymer manifold as recited in claim 1 wherein the polymer film is formed from substantially the same polymer material as the polymer tubes.

11. A polymer manifold as recited in claim 1 further comprising at least one additional polymer film secured over the first polymer film to create a multi-layer polymer film arranged to seal the first end of the chamber while leaving the first openings of the polymer tubes exposed.

12. The polymer manifold recited in claim 1 wherein the polymer film defines a thin membrane that spans an interstitial space between the plurality of polymer tubes that are within the chamber.

13. The polymer manifold recited in claim 1 wherein,
    the tubes are made of a material selected from Polyethylene, Polypropylene, Polyamide, Polysulfone, and Polyphenylene Sulfide materials;
    the polymer film is made of a material selected from Polyethylene, Polypropylene, Polyamide, Polysulfone, and Polyphenylene Sulfide materials; and
    the potting material is made of a material selected from Polyurethanes and Silicones materials.

14. The polymer manifold recited in claim 1 wherein,
    each of the polymer tubes are configured with a tube sidewall that extends between the first and second ends and that terminates at a first tube rim at a distal tip of the first end of the tube; and
    the polymer film is welded to first tube rim at a distal tip of the first end of the tube.

15. A polymer heat exchanger comprising:
    a multiplicity of polymer tubes, each of the polymer tubes including first and second ends and a passage having first and second openings;
    a first manifold housing that harnesses the first ends of the multiplicity of tubes, wherein the first manifold housing includes a first chamber that receives and collectively surrounds the first ends of the tubes and a first threaded section for threadably connecting the polymer heat exchanger to a fluid supply conduit arranged to communicate a fluid to the multiplicity of tubes;
    a second manifold housing that harnesses the second ends of the multiplicity of tubes, wherein the second manifold housing includes a second chamber that receives the second ends of the multiplicity of tubes, and a second threaded section for threadably connecting the polymer heat exchanger to a second fluid conduit arranged to communicate a fluid from the multiplicity of tubes;
    a first polymer film secured to a supporting surface of the first manifold housing and to a distal tip of the first end of each of the multiplicity of tubes, the first polymer film being arranged to seal a first end of the manifold chamber while leaving the first openings of the polymer tubes exposed to thereby create a first manifold; and
    a second polymer film secured to the second manifold housing and to the second ends of each of the plurality of tubes, the second polymer film being arranged to seal an end of the second manifold chamber while leaving the second openings of the plurality of polymer tubes exposed to thereby create a second manifold;
    a first potting material disposed within the first chamber that reinforces the first polymer film;

a second potting material disposed within the second chamber that reinforces the second polymer film; and wherein distal tips of the first ends of the tubes are substantially flush with a first face of the first manifold housing and the polymer film is secured to the distal tips of the tubes and the first face of the manifold housing such that the first tube openings are presented on a plane that includes the first face of the manifold housing.

16. A polymer heat exchanger as recited in claim 15 wherein:

the outer diameter of the polymer tubes is in the range of approximately 0.08 to 0.25 inches;

the polymer tubes are secured together by a web and the web is rolled to form a bundle of tubes; and the manifold housing is formed from substantially the same polymer material as the polymer tubes.

\* \* \* \* \*